United States Patent [19]

Abrams et al.

[11] 4,246,245

[45] Jan. 20, 1981

[54] SO₂ REMOVAL

[75] Inventors: Jack Z. Abrams; Robert M. Sherwin, both of San Rafael, Calif.

[73] Assignee: Bechtel International Corporation, San Francisco, Calif.

[21] Appl. No.: 406

[22] Filed: Jan. 2, 1979

[51] Int. Cl.³ .............................................. C01B 17/00
[52] U.S. Cl. .................................. 423/242; 423/166; 423/512 A
[58] Field of Search ............... 423/242 A, 512 A, 166, 423/242 R, 244 A, 244 R

[56] References Cited

U.S. PATENT DOCUMENTS

| | | | |
|---|---|---|---|
| 2,718,453 | 9/1955 | Beckman | 423/512 A |
| 3,622,270 | 11/1971 | Shah | 423/242 A |
| 3,650,692 | 3/1972 | Villiers-Fisher | 423/242 A |
| 3,653,823 | 4/1972 | Shah | 423/242 A |
| 3,904,742 | 9/1975 | Akimoto | 423/242 A |
| 3,929,968 | 12/1975 | Taub | 423/242 A |
| 3,932,587 | 1/1976 | Grantham et al. | 423/242 A |

FOREIGN PATENT DOCUMENTS

| | | | |
|---|---|---|---|
| 51-43999 | 11/1976 | Japan | 423/242 A |
| 708095 | 4/1954 | United Kingdom | 423/242 A |

OTHER PUBLICATIONS

Chemistry and Technology of Lime and Limestones, Boynton, 1965.

*Primary Examiner*—O. R. Vertiz
*Assistant Examiner*—Gregory A. Heller
*Attorney, Agent, or Firm*—Bertram I. Rowland

[57] ABSTRACT

Improved methods are provided for the efficient and economic removal of sulfur dioxide from gases which comprise contacting the gas with neutralizing values obtained from Type S hydrated lime, i.e. calcined dolomite slaked with water under elevated temperature and pressure. The Type S hydrated dolomitic lime may be used in conjunction with a wet scrubber to provide base and neutralizing magnesium values, in a spray dryer or dry scrubber, or directly introduced into the boiler. The use of Type S hydrated dolomitic lime greatly enhances the efficiency of sulfur dioxide removal, providing for enhanced utilization of base values and more rapid rate of reaction.

15 Claims, No Drawings

SO₂ REMOVAL

BACKGROUND OF THE INVENTION

1. Field of the Invention

Sulfur is found admixed with a wide variety of fossil fuels and metal ores. When oxidizing the naturally occurring minerals and fuels, the sulfur oxidation product is sulfur dioxide. Sulfur dioxide is a serious pollutant, since in itself it forms sulfurous acid and upon oxidation sulfuric acid. Both of these materials can result in serious contamination and injurious effects to the environment.

One of the ways to prevent sulfur dioxide in waste gases from being vented to the atmosphere is to treat sulfur dioxide containing gaseous effluents with base, either in the liquid or vapor phase. Various bases have been used, such as soda ash, lime, and the like.

There are a number of considerations in the choice and manner in which the base is employed. The first consideration is economics. There are a number of factors involved with the economics. One factor is the cost of the alkaline or basic material. A second factor is the efficiency of the alkaline material, for the less efficient the material, the more costly the removal of sulfur dioxide will be, in requiring greater amounts than stoichiometric to provide for the desired reduction in sulfur dioxide in the effluent. A third consideration is the degree to which the sulfur dioxide may be removed with a given amount of the base.

Besides the base which is employed, another consideration is the equipment required for processing and the effect of the materials employed on the equipment. Finally, there is the nature of the sludge or residue and the manner in which the residue may be disposed of.

In developing a process for removing sulfur dioxide from effluent gases, normally flue gases, all of the above considerations are involved for an effective process. In view of the very large volumes of gas which exit from power plants, processing plants, and other installations burning or oxidizing sulfur containing materials, small improvements in efficiency can result in dramatic savings. It is therefore desirable to provide for simple and efficient processes utilizing comparatively inexpensive materials, which can rapidly reduce sulfur dioxide content in waste gases and the like to acceptable levels while producing residues which may be readily disposed of.

2. Description of the Prior Art

Type S hydrated dolomitic lime, which is prepared from calcined dolomite, is available as a structural material from Flintkote Lime Products. Description of the preparation of Type S hydrated lime may be found in Boynton, *Chemistry and Technology of Lime and Limestone*, Interscience Publishers, New York, 1965, pages 167, 288–9, 302–307, 317–318, and 333–338. U.S. Pat. No. 4,046,856 describes a sulfur dioxide removal process employing magnesium with recycling of the magnesium as magnesium hydroxide. Other patents of interest describing processing of flue gas with basic materials include U.S. Pat. Nos. 2,068,882, 3,883,639, 3,941,378, 3,919,393, 3,991,172, 4,011,299, and 4,018,868. See also, C.A. 81, 68036u, 82, 63922r, 82 174821b, 84, 155095t and Ger. Offen. No. 2,412,372.

SUMMARY OF THE INVENTION

An improved method is provided for the removal of sulfur dioxide from sulfur dioxide containing gases, particularly flue gases from the burning of fossil fuels, which comprises contacting the gas with a sufficient amount of sulfur dioxide neutralizing values derived from Type S hydrated lime to substantially reduce the sulfur dioxide content of the gas. The contacting can be carried out under various conditions, such as a wet scrubber, spray drying, or boiler injection, where the sulfur dioxide is rapidly and efficiently neutralized to a product, which may be further treated to provide an environmentally acceptable waste product. In one embodiment, employing a wet scrubber, Type S hydrated dolomitic lime is employed as a source of magnesium sulfite which reacts with sulfur dioxide to provide a mixture of magensium sulfite-bisulfite. A sidestream containing the magnesium sulfite-bisulfite is oxidized to sulfate, and the magnesium sulfate converted to magnesium hydroxide, which is combined with the wet scrubber effluent to provide magnesium sulfite.

DESCRIPTION OF THE SPECIFIC EMBODIMENTS

An improved and highly efficient method is provided for the removal of sulfur dioxide from sulfur dioxide containing gases, particularly flue gases, which comprises contacting the sulfur dioxide containing gas with a sufficient amount of sulfur dioxide neutralizing values derived from Type S hydrated dolomitic lime. The Type S hydrated dolomitic lime may be used directly or indirectly, by itself or in combination with other alkaline values. Both wet and dry techniques may be employed, such as wet scrubbing, spray drying, and boiler injection.

The sulfur dioxide neutralizing values are normally at least in part derived from Type S hydrated dolomitic lime, which is calcined dolomite, hydrated under conditions of elevated temperatures and pressures. As provided by Flintkote, Type S hydrated dolomitic lime has a calcium hydroxide content of about 55%, magnesium hydroxide content of about 40%, magnesium oxide content of about 2%, and water of about 0.2%. The settling rate to ½ volume in minutes, (ASTM C-110) is about 225, while the specific gravity is 2.24. The sieve analysis shows that 100% of the particles passed 20 mesh, while 79% of the particles pass 325 mesh.

As described in *Chemistry and Technology of Lime and Limestone*, supra, page 336, Type S dolomitic lime is hydrated in an autoclave at pressures of from about 25 to 100 psi, and temperatures from about 250° to 400° F.

In the subject method, a sulfur dioxide containing gas is contacted with sulfur dioxide neutralizing values derived at least in part from Type S hydrated dolomitic lime where all magnesium present is derived from Type S hydrated dolomitic lime, the total sulfur dioxide neutralizing values being present in sufficient amount to reduce the level of sulfur dioxide in the flue gas to substantially less than about 10% of the original level, preferably less than about 5% of the original level, usually to a value below about 70 ppm, more usually to a value below about 50 ppm.

Depending upon the mode employed for sulfur dioxide removal, the Type S hydrated dolomitic lime will normally be employed as a powder or slurry. The amount of solids in the slurry will also vary depending upon the mode of sulfur dioxide reduction employed. Usually solids content in slurries will be at least about 10 weight percent, more usually at least about 40 weight, and generally not more than about 80 weight percent.

The wet scrubbing method for sulfur dioxide removal will be considered first. In general terms, the sulfur dioxide containing flue gas is contacted with a magnesium sulfite solution in a scrubbing zone at a pH in the range of about 6–7.5 to produce magnesium bisulfite. The scrubbing zone effluent is divided into two streams, a major cycle stream, and a minor regeneration stream. The regeneration stream is subjected to oxidation to oxidize bisulfite and sulfite to sulfate and at least a major portion of the oxidized solution made alkaline with Type S hydrated dolomitic lime and other hydrated lime to produce magnesium hydroxide and inert insoluble calcium sulfate. The basic stream is then combined with the major recycle stream to neutralize the magnesium bisulfite to magnesium sulfite and restore lost magnesium values. A second minor side stream is taken from the stream between the scrubber effluent and alkalization, usually from the recycle tank or oxidizer, as a solids removal stream, which is separated into a sludge fraction and a liquid fraction, with the sludge fraction rejected and the liquid fraction combined with the major recycle stream.

The subject wet scrubbing method provides many advantages: calcium is not present as an absorbent in the scrubber which avoids scaling; only minor amounts of environmentally undesirable soluble magnesium salts are discharged; efficient utilization of sulfur dioxide neutralizing values is achieved; all of the absorption and neutralization reactions are rapid due to the use of Type S hydrated dolomitic lime and regenerated magnesium as absorbent, so that the rapidity of the reactions coupled with the efficient use of the neutralizing values allows for smaller equipment; and sulfur dioxide is efficiently removed from the gas stream to environmentally acceptable values.

While Type S hydrated dolomitic lime has many advantages as described above, the subject wet scrubbing process could use any source of make-up magnesium which is convertible, either directly or indirectly, to magnesium sulfite.

The wet scrubbing operation will now be considered in greater detail. A wet scrubbing unit may be employed of conventional design, such as venturi-type wet scrubbing unit, a spray absorber, a packed tower, a tray tower or the like. Continuously fed to the scrubbing tower is the effluent from the scrubbing tower mixed with an alkaline stream from the reactor, the latter to be described in more detail subsequently. The slurry to the scrubber will contain soluble magnesium sulfite, magnesium bisulfite, magnesium sulfate, insoluble calcium sulfate, and other calcium and magnesium salts, and may also include fly ash or fly ash reactant products. The pH of the slurry will be below 8, generally in the range of 6 to 7.5. The various insoluble salts will be maintained at a predetermined level of suspended solids. Once the system is in equilibrium, the solids content of the slurry may be maintained fairly constant without significant modification of the various parameters.

A strongly alkaline scrubbing medium is avoided, preventing the formation of basic magnesium carbonate. The magnesium sulfite which is present rapidly and efficiently reacts with the sulfurous acid formed from sulfur dioxide and water to form a magnesium sulfite-bisulfite mixture, resulting in an acidic effluent, with concurrent formation of magnesium sulfate. The pH of the exiting effluent will usually be 6.5 or below. Substantially complete reaction of the sulfur dioxide takes place, so that substantially stoichiometric amounts of the make-up neutralizing materials are provided for the amount of sulfur dioxide removed in the scrubber. Neutralization base values may not only be derived from the magnesium sulfite, but fly ash may provide alkalinity for neutralization of the sulfur dioxide.

After contacting the scrubbing stream, the effluent gas will pass through a mist eliminator. The mist eliminator may be washed with water or individual or combinations of streams from other sources, including the pond return liquor, thickener overflow, or cooling tower blowdown water. The mist eliminator removes entrained solid particles and liquor droplets and the substantially sulfur dioxide free gaseous stream is discharged from the mist eliminator.

The effluent slurry exits from the scrubber to a slurry recycle tank. To the slurry in the slurry recycle tank is added a stream from the reactor tank, which provides the base values for reaction with the sulfur dioxide. The base reacts with the magnesium bisulfite to produce magnesium sulfite and restore the pH to greater than 6.

A portion of the slurry in the slurry recycle tank is removed as a minor side stream and pumped to the oxidizer. The oxidizer is employed to oxidize sulfite to sulfate, primarily magnesium sulfite-bisulfite to magnesium sulfate. Conveniently, oxidation is carried out with compressed air.

A variable bleed stream from the recycle tank or oxidizer, preferably the latter, is directed to the thickener or settling pond. The rate of flow of this sidestream is chosen to provide the desired suspended solids content in the system, generally from about 10 to 15 weight percent. The sludge is dewatered by conventional means. The overflow containing solubles from the sludge separation is transferred to an overflow or holding tank to which is also directed the mother liquor from the sludge dewatering unit, which may be a pond, if the pond is used for sludge dewatering, or a sludge dewatering unit. As indicated previously, the overflow tank contents may be used for washing the mist eliminator.

The reactor tank is employed to provide the desired base or neutralizing values. Into the reactor tank is introduced the stream from the oxidizer, optionally a small underflow slurry stream from the thickener in sufficient amount to maintain the desired concentration of suspended solids, and sufficient alkali. The solids serve as nucleating agents for the rapid formation of particles, inhibiting scale formation. The base is normally Type S hydrated dolomitic lime and other hydrated lime, preferably prepared in substantially the same manner as the Type S hydrated dolomitic lime to enhance its reactivity.

The Type S hydrated dolomitic lime is added in sufficient amount to make up the lost magnesium, which is lost primarily with the sludge. The other hydrated lime, calcium hydroxide, is added in sufficient amount to transform a major portion of the non-absorbent magnesium sulfate to magnesium hydroxide. The combined Type S hydrated dolomitic lime and the calcium hydroxide are added in sufficient amount to provide the necessary base balues to react with the magnesium bisulfite in the recycle tank to provide adequate sulfur dioxide neutralization capacity in the scrubber.

The slurry formed in the reactor is then transferred to the recycle tank to be mixed with the recycle slurry from the scrubber. The slurry may also include, besides the various calcium and magnesium compounds, fly ash or fly ash products. The Type S hydrated lime may be added as a powder or slurry or by any other convenient means which provides for the desired concentration in the reactor. By employing specially hydrated calcium oxide, faster reaction can be achieved, so that the residence time in the reactor may be reduced as compared to using normally hydrated lime. However, the special hydration is not required, but provides for a more efficient process.

Turning now to a consideration of the other methods for sulfur dioxide removal, improved results can also be obtained by spray drying with a Type S hydrated dolomitic lime slurry directly injected into the flue gas, where the solids content of the slurry is sufficient to minimize the temperature reduction to less than about 100° F. Normally, exit flue gases will normally have temperatures in the range of about 250° to about 300° F. Alternatively, the Type S hydrated dolomitic lime may be introduced directly into the boiler. A sufficient amount of the Type S hydrated dolomitic lime is introduced to reduce the sulfur dioxide content to the desired level.

As the flue gas passes through a spray dryer, the flue gas is contacted with the Type S hydrated dolomitic lime slurry. Contact times can be very short, fractions of a second. The flue gas after contact with the Type S hydrated dolomitic lime, is then passed through a particle separator, which can be a bag filter, precipitator, cyclone, scrubber, etc. Under the conditions of the neutralization, most of the sulfite which forms will be oxidized to sulfate.

In order to demonstrate the advantages of using Type S hydrated dolomitic lime for removal of sulfur dioxide, Type S hydrated dolomitic lime was titrated at a rate of 3 ml/per min with 10% by weight aqueous sulfuric acid to a pH of 6. The lime solution had 10 g of the Type S hydrated dolomitic lime in 90 ml of water. When pH 6 was reached, approximately 126 ml of sulfuric acid had been added, with 92% of the dolomitic lime neutralized. By comparison, when the same experiment was carried out replacing the Type S hydrated dolomitic lime with type N hydrated lime, at pH 6, approximately 56 ml of sulfuric acid was added for an alkali utilization of 44%. This experiment demonstrates the much higher efficiency of the Type S hydrated dolomitic lime in neutralizing acid.

In the next study, a wet scrubbing pilot plant was employed, where a small side stream of flue gas was taken upstream from the electrostatic precipitator from a coal burning power plant. The pilot plant employed a conventional venturi scrubber. The process was monitored for sulfur dioxide, pH, and volume flows. Both Type S hydrated dolomitic lime and Type N hydrated lime were tested. The following parameters were maintained: flue gas flow rate in the scrubber was about 3,340 acfm at 250° F. and 13.66 psia; slurry recycle rate was 45 gpm into the venturi ($L/G=15$) (L—liquid rate, gallons/min G—gas rate, thousands of cubic feet/min) and 55 gpm into the absorption spray ($L/G=18$) or a total of $L/G=33$; percent suspended solids in the recycle slurry was about 12% by weight; residence time in the recycle tank was about 8 min; pressure drop in the venturi for fly ash removal was about 17 inches water; mist eliminator washing was about 3 gpm (0.5 gpm/ft$^2$); wash tray feed was 11 gpm and wash tray underspray was about 2.4 gpm.

The process was performed as follws: Flue gas from a pulverized coal fired boiler containing about 2 grains of fly ash per dry standard cubic foot and about 600–1,000 ppm of sulfur dioxide was passed to a venturi scrubber where the gas was contacted with a recycle tank slurry flow of 45 gpm. The high gas velocity in the venturi throat (200 ft/sec) atomized the liquor into fine droplets which contacted the fly ash fine particles and removed them from the gas stream. The gas and slurry were then directed to the absorption spray vessel. The flue gas passed through the slurry absorption spray (55 gpm), where most of the sulfur dioxide was removed. The gas temperature dropped to about 125° F. and the gas was water saturated. The flue gas with the entrained droplets was then passed through the wash tray, where the entrained slurry droplets were removed from the gas bubbles. The gas stream was then passed through the mist eliminator where most of the liquid mist was removed.

The gas was then heated to a temperature of about 175° F. by means of heat exchange with a contribution of about 12° F. resulting from the I.D. fan. The clean reheated flue gas was then exhausted to the atmosphere through a stack.

The slurry from the venturi tank and from the absorption spray was directed by gravity into a recycle tank.

A stream of about 2–3 gpm of slurry was bled from the recycle tank to the oxidizer, where compressed air was bubbled through the stream to oxidize all of the magnesium sulfite and bisulfite into magnesium sulfate, as well as minor amounts of calcium sulfite and bisulfite to calcium sulfate. The overflow stream from the oxidizer was divided into a first stream of about 1 gpm which was directed to a thickener tank or settling tank, while a second stream of about 2 gpm was directed to a reactor tank. The first stream was employed to maintain a constant solids inventory in the system. With the present parameters, about 12% suspended solids was maintained. The solids provided for nucleation in the reactor tank for rapid precipitation of supersaturated calcium sulfate, thus avoiding scaling in the reactor tank.

The underflow or sludge from the thickener was pumped about every two hours into a barrel from which the supernatant was pumped into the recycle tank and the sludge containing about 50% moisture was pumped to an outside pond.

Into the reactor tank was directed Type S hydrated dolomitic lime and type N hydrated lime as dry solids. If desired, slurries could be employed in place of the dry solids and preferably the hydrated lime would be hydrated in the same manner as the Type S hydrated dolomitic lime. The ratio was about three parts by weight of hydrated lime to one part by weight of hydrated dolomitic lime. For an inlet flue gas sulfur dioxide content of about 1,050 ppm, the feed rate of hydrated dolmitic lime was about 35 g/min, while the feed rate of hydrated lime was about 140 g/min to provide a final flue gas sulfur dioxide content of about 50 ppm (0.1 lb sulfur dioxide per million BTU heat input). For a sulfur dioxide inlet flue gas content of about 750 ppm, with the same sulfur dioxide emission level, the feed rate was about 28 g/min hydrated dolomitic lime and 90 g/min hydrated lime.

In the reactor tank, the soluble magnesium sulfate reacted with the calcium hydroxide to produce magnesium hydroxide and calcium sulfate, both of low solubility. The effluent from the reactor tank was pumped to the recycle tank at a rate of about 2.5 gpm. Conveniently, the addition of the hydrated dolomitic lime and hydrated lime may be followed by the pH of the mixture in the reactor tank, with the pH in the reactor tank varying between 9 and 10, which provides a pH in the recycle tank of between about 6 and 7.

The ratio of hydrated dolomitic lime to hydrated lime is varied depending upon the magnesium sulfate concentration in the thickener tank underflow, increasing the ratio when the magnesium sulfate concentration is less than 40,000 ppm and vice versa.

To insure the desired solids content in the reactor a portion of the underflow from the thickener may be continuously transferred to the reactor tank.

It should be noted that the fly ash had residual basicity as basic calcium and reacted with the magnesium sulfate in the liquor to produce magnesium hydroxide and calcium sulfate.

The amount of base provided as hydrated dolomitic lime and hydrated lime will vary depending upon the sulfur dioxide concentration and the flue gas. At 700–750 ppm of sulfur dioxide, approximately 95% of stoichiometric is employed, while at 1050 ppm of sulfur dioxide, approximately 100% of stoichiometric is employed. However, if the fly ash were to be removed and the sludge dewatered to about 20% moisture, the total base added would be about 110% of stoichiometric.

In accordance with the above described procedure two runs were carried out, where the base was provided as a mixture of Type S hydrated dolomitic lime and hydrated lime in, as compared to base provided as hydrated lime. The following table indicates a number of the parameters of the run over one day and the results.

TABLE

|  | average $SO_2$ ppm | | lbs $SO_2$ M BTU |
|---|---|---|---|
|  | inlet | outlet | outlet |
| Type S Hydrated Dolomitic Lime & Hydrated Lime | 1039 | 50.7 | 0.101 |
| Hydrated Lime | 920 | 394 | 0.79 |

Lower outlet $SO_2$ levels than 0.79 lbs $SO_2$/M BTU would be difficult to realize without scaling under the process conditions selected when hydrated lime was employed. However, the use of Type S hydrated dolomitic lime and hydrated lime together in the reactor tank made it possible to operate in the scrubber with soluble magnesium sulfite (a very good $SO_2$ absorbent) and, therefore, to achieve higher $SO_2$ removal efficiency without scaling.

The subject method employing the Type S hydrated dolomitic lime has a number of advantages which are extremely important in a system where very large amounts of materials are required, large volumes of liquids must be pumped and recycled, and the waste material discharged should be relatively free of pollutants. In the subject method, very high sulfur dioxide removal efficiency is achieved to a level of less than 0.2 pound $SO_2$/per million BTU emission rate. In addition, the sulfur dioxide is captured as magnesium bisulfite, which is then oxidized to magnesium sulfate, which greatly reduces or eliminates the problem of scaling which is typically encountered when calcium hydroxide reacts with sulfur dioxide.

The subject method has relatively low operating costs, because it involves relatively low pumping rates, relatively small material transfers, and high alkali utilization. Because of the greater efficiency, smaller equipment may be employed, so tha capital costs are reduced.

A further advantage is that cooling tower blowdown water may be employed as make-up water. Because the cooling tower blowdown water has relatively high levels of dissolved calcium, the potential for supersaturation of calcium in the medium is enhanced when calcium hydroxide is employed, with greater possibilities for scaling. In the subject system, where the calcium hydroxide exists in the reactor only to react with magnesium sulfate to provide magnesium hydroxide, together with calcium sulfate which is substantially insoluble and inert, the problem of supersaturation potential of the calcium is greatly reduced, and thus the potential for scale formation.

Although the foregoing invention has been described in some detail by way of illustration and example for purposes of clarity of understanding, it will be obvious that certain changes and modifications may be practiced within the scope of the appended claims.

What is claimed is:

1. A continuous method for reducing the sulfur dioxide content of a sulfur dioxide containing gas which comprises:

contacting said sulfur dioxide containing gas in a wet scrubbing zone with recycle tank slurry having an amount of magnesium sulfite at least sufficient to neutralize said sulfur dioxide to a predetermined value to provide an exhaust gas having a substantially reduced amount of sulfur dioxide and a wet scrubbing zone effluent containing magnesium primarily as its sulfite, bisulfite and sulfate; and wherein said recycle tank slurry is substantially free of calcium containing sulfur dioxide neutralizing values to inhibit scale formation.

transferring said wet scrubbing zone effluent to a recycle tank;

transferring a sidestream from said recycle tank, in an amount for continuously replenishing magnesium sulfite in said wet scrubbing zone, to an oxidizer zone;

oxidizing said magnesium sulfite and bisulfite to magnesium sulfate to provide an oxidizer effluent stream;

transferring at least a portion of said oxidizer effluent stream to a reaction zone, where said magnesium sulfate is reacted with calcium hydroxide to provide magnesium hydroxide and insoluble calcium sulfate and make-up magnesium is added as Type S hydrated dolomitic lime to provide an alkaline effluent;

transferring said alkaline effluent to said recycle tank to mix with said wet scrubbing zone effluent to provide said recycle tank slurry; and transferring said recycle tank effluent to said wet scrubbing zone.

2. A method according to claim 1, including transferring a sidestream from said recycle tank to a settling zone; and separating said side stream into a sludge and a supernatant liquid and returning said supernatant liquid to said recycle tank.

3. A method according to claim 2, including transferring a portion of said sludge to said reaction zone to maintain a relatively constant suspended solids level.

4. A method according to any of claims 1 to 3, wherein the pH of said alkaline effluent is in the range of about 9 to 10 and the pH of said recycle tank slurry is in the range of about 6 to 7.5

5. A method according to claim 1 including transferring a substantially calcium sulfite free sidestream from said recycle tank to a settling zone;

separating said sidestream into a substantially magnesium free sludge and a supernatant liquid; and returning said supernatant liquid to said recycle tank.

6. A method according to claim 1, wherein calcium present in said recycle tank slurry is present as calcium sulfate and fly ash.

7. A method according to claim 6 including transferring a substantially calcium sulfite free sidestream from said recycle tank to a settling zone;

separating said sidestream into a substantially magnesium free sludge and a supernatant liquid; and returning said supernatant liquid to said recycle tank.

8. A method according to claim 1, including the step of adding make-up water from cooling tower blowdown to said recycle tank or mist eliminator washing.

9. A method according to claims 1, 6, or 8 including transferring a substantially calcium sulfite free sidestream from said recycle tank to a settling zone;

separating said sidestream into a substantially magnesium free sludge and a supernatant liquid; and returning said supernatant liquid to said recycle tank.

10. A continuous method for reducing the sulfur dioxide content of a sulfur dioxide containing gas which comprises:

contacting said sulfur dioxide containing gas in a wet scrubbing zone with recycle tank slurry having an amount of magnesium sulfite at least sufficient to neutralize said sulfur dioxide to a predetermined value to provide an exhaust gas having a substantially reduced amount of sulfur dioxide and a wet scrubbing zone effluent containing magnesium primarily as its sulfite, bisulfite, and sulfate; and wherein said recyle tank slurry is substantially free of calcium containing sulfur dioxide neutralizing values to inhibit scale formation;

transferring said wet scrubbing zone effluent to a recycle tank;

transferring a sidestream from said recycle tank in an amount for continuously replenishing magnesium sulfite in said wet scrubbing zone, to an oxidizer zone;

oxidizing said magnesium sulfite and bisulfite to magnesium sulfate to provide an oxidizer effluent stream;

transferring at least a portion of said oxidizer effluent stream to a reaction zone, where said magnesium sulfate is reacted with calcium hydroxide to provide magnesium hydroxide and make-up magnesium is added, in an amount sufficient to maintain the desired magnesium concentration in said recycle tank, to provide an alkaline effluent;

transferring said alkaline effluent to said recycle tank to mix with said wet scrubbing zone effluent to provide said recycle tank slurry; and transferring said recycle tank effluent to said wet scrubbing zone.

11. A method according to claim 10, including transferring a sidestream from said recycle tank to a settling zone; and separating said sidestream into a sludge and a supernatant liquid and returning said supernatant liquid to said recycle tank.

12. A method according to any of claims 10 and 11, wherein the pH of said alkaline effluent is in the range of about 9 to 10 and the pH of said recycle tank slurry is in the range of about 6 to 7.5.

13. A method according to claim 11, wherein said sludge is substantially magnesium free and calcium sulfite free.

* * * * *